US007693089B2

(12) United States Patent
Tantsis et al.

(10) Patent No.: US 7,693,089 B2
(45) Date of Patent: Apr. 6, 2010

(54) METHOD AND SYSTEM FOR PERFORMING CIRCUIT UPGRADE

(75) Inventors: Paul Tantsis, Santa Rosa, CA (US); Amit Bhardwaj, Petaluma, CA (US); Ping Yan, Rohnert Park, CA (US); Andrew K. Lie, Petaluma, CA (US); Lisong Liu, Herndon, VA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 11/022,596

(22) Filed: Dec. 22, 2004

(65) Prior Publication Data

US 2006/0133285 A1 Jun. 22, 2006

(51) Int. Cl.
*H04L 12/28* (2006.01)
*G01N 37/00* (2006.01)

(52) U.S. Cl. ............... 370/254; 370/351; 702/83
(58) Field of Classification Search ............ 370/248, 370/254, 244, 250, 351, 258; 709/223; 702/83
See application file for complete search history.

(56) References Cited

U.S. PATENT DOCUMENTS

| | | | |
|---|---|---|---|
| 5,600,631 A * | 2/1997 | Takatori et al. ............ 370/217 |
| 5,942,989 A | 8/1999 | Nagasawa et al. |
| 6,038,678 A * | 3/2000 | Fukushima et al. ............ 714/4 |
| 6,219,336 B1 * | 4/2001 | Takahashi et al. ............ 370/223 |
| 6,377,958 B1 * | 4/2002 | Orcutt ............ 707/200 |
| 6,496,871 B1 * | 12/2002 | Koyama et al. ............ 719/317 |
| 6,570,867 B1 * | 5/2003 | Robinson et al. ............ 370/351 |
| 6,584,071 B1 * | 6/2003 | Kodialam et al. ............ 370/238 |
| 6,704,030 B1 * | 3/2004 | McDonald et al. ............ 715/736 |
| 6,744,769 B1 * | 6/2004 | Siu et al. ............ 370/395.32 |
| 6,760,862 B1 * | 7/2004 | Schreiber et al. ............ 714/15 |
| 7,065,572 B1 | 6/2006 | Mansingh et al. |
| 7,170,851 B1 * | 1/2007 | Chen et al. ............ 370/222 |
| 7,363,362 B1 * | 4/2008 | Friedman et al. ............ 709/223 |
| 7,372,816 B2 * | 5/2008 | Mannepalli et al. ............ 370/238 |
| 2002/0186682 A1 * | 12/2002 | Kawano et al. ............ 370/351 |
| 2003/0005101 A1 * | 1/2003 | Falzon ............ 709/223 |
| 2003/0009552 A1 * | 1/2003 | Benfield et al. ............ 709/224 |
| 2003/0012142 A1 | 1/2003 | Nagahama |
| 2003/0093479 A1 * | 5/2003 | Mellen-Garnett et al. ... 709/205 |
| 2003/0182411 A1 * | 9/2003 | Wang et al. ............ 709/223 |
| 2004/0083284 A1 * | 4/2004 | Ofek et al. ............ 709/224 |
| 2004/0193729 A1 * | 9/2004 | Saraph ............ 709/241 |

(Continued)

OTHER PUBLICATIONS

Galen H. Sasaki et al, "Minimal Cost WDM SONET Rings That Guarantee No Blocking", Optical Networks Magazine, SPIE/Baltzer Science Publishers 1388, 6916/2000, Oct. 2000.

*Primary Examiner*—Kevin C Harper
*Assistant Examiner*—Xavier Szewai Wong
(74) *Attorney, Agent, or Firm*—Cindy Kaplan

(57) ABSTRACT

A system and method for performing an upgrade in a communication network comprising network elements coupled together to form one or more circuits are disclosed. In one embodiment, the upgrade is generated at a node in communication with the circuits and the method generally comprises providing a list of circuits or spans available for the upgrade and receiving input from a user identifying at least one circuit to be upgraded or at least one span for the upgraded circuit and a type of upgrade to be performed. The method further comprises automatically performing the upgrade.

40 Claims, 17 Drawing Sheets

U.S. PATENT DOCUMENTS

2005/0135259 A1* 6/2005 Yazdi et al. ............... 370/241
2005/0195864 A1   9/2005 Matsuo et al.
2006/0028991 A1* 2/2006 Tan et al. ................ 370/237
2006/0129706 A1* 6/2006 Mueller .................... 710/22

* cited by examiner

METHOD AND SYSTEM FOR PERFORMING CIRCUIT UPGRADE

BACKGROUND OF THE INVENTION

The present invention relates generally to communication networks, and more specifically, to upgrading circuits in an optical network in a non-service affecting manner.

Today, SONET/SDH is the predominant technology for transport in worldwide public carrier networks. One of the key attributes of SONET/SDH is its ability to provide network survivability in point-to-point, ring, and mesh architectures. Many networks today are based upon fiber-ring architectures, as evidenced by the proliferation of SONET/SDH rings all the way from the long-haul backbone to the metropolitan and regional areas. Ring topologies are important because SONET uses it for protection purposes. Network operators have become accustomed to the fast, timely recovery capabilities provided by SONET/SDH automatic protection switching (APS) schemes, such as unidirectional path switched rings (UPSR)/sub-network connection protection (SNCP), 1+1 and bi-directional line switched rings (BLSR).

UPSR is a closed-loop, transport architecture that protects against fiber cuts and node failures by providing duplicate, geographically diverse paths for each circuit. A UPSR network is composed of two counter rotating fiber rings; referred to as the working and protection rings. Adjacent nodes on the ring are connected by a single pair of optical fibers, which form the two counter rotating rings carrying traffic in opposite directions. Working traffic is sent on the working ring in one direction on one fiber and copies are transmitted on the protection ring in the opposite direction over the other fiber. A destination node in the ring receives two signals, one along each ring. The node monitors transmission on both fibers and performs a protection switch to the alternate path if it detects degraded transmission. In this way, when there is a single link failure, it can recover by switching to the available signal. The UPSR is simpler than the two-fiber (2F) or four-fiber (4F) BLSRs since it requires only two fibers to operate.

A 2F-BLSR network also has two counter rotating fiber rings. Each fiber pair between two nodes is a full-duplex link. In this link, half the bandwidth carries working traffic, and the other half is for protection. If there is a single link failure, the working traffic that was carried on the link is looped back around the ring using the protection bandwidth of the other links. A 4F-BLSR network is similar to the 2F-BLSR except that there are two pairs of counter rotating fiber rings. One pair is used for working traffic and the other is used for protection.

It is often desired to upgrade an unprotected optical circuit to a path protected optical circuit, or upgrade a UPSR to a BLSR. Topology upgrade of circuits involves various steps at a number of nodes in the network. Conventional systems for upgrading an optical circuit use a set of time consuming and labor intensive manual steps which may require a technician to be present at each location. Conventional methods for upgrading circuits require, for example, use of TL1 (Transaction Language 1) and involve a piecemeal upgrade of the circuit at each node. Another drawback to these conventional topology upgrade techniques is that they do not provide a network view of the circuit during the upgrade. Thus, the user has to remember each step, perform manual checks at each step, and manually perform each step on each node.

There is, therefore, a need for a method and system for providing automatic in-service circuit upgrades. It is desirable that the method and system allow for the circuit or topology of a live network to be modified or converted without losing traffic on existing circuits.

SUMMARY OF THE INVENTION

A system and method for performing a circuit upgrade in a communication network comprising network elements coupled together to form one or more circuits are disclosed. In one embodiment, the upgrade is generated at a node in communication with the circuits and the method generally comprises providing a list of circuits or spans available for upgrade at the node and receiving input from a user identifying at least one circuit to be upgraded or at least one span for the upgraded circuit and a type of upgrade to be performed. The method further comprises automatically performing the circuit upgrade.

In another aspect of the invention, a system for performing a circuit upgrade in a communication network generally comprises a graphical user interface operable to provide a user with a list of circuits or spans available for conversion at a node and receive input from a user identifying at least one circuit to be upgraded or at least one span for the upgraded circuit and a type of upgrade to be performed and a processor operable to automatically perform the upgrade at a circuit level.

The system and method may be used, for example, to upgrade a linear circuit to a UPSR or upgrade a UPSR to a 2F-BLSR.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system of the present invention provide the ability to modify or convert the topology or upgrade one or more circuits of a live network without affecting traffic on existing circuits (i.e., in a non-service affecting manner). The network nodes and links may be reconfigured and the type of protection used may be changed. As described below, a GUI wizard is preferably used to step the user through the upgrade process. The GUI wizard provides a network and circuit view of the upgrade, which allows the user to automatically perform and track the upgrade on the entire circuit rather than having to use TL1 to modify and manually track the upgrade on each individual node. The system provides the user with the freedom of manually routing a protect/alternate path or automatically finds the shortest path for each circuit on a ring. As described in detail below, error recovery is an important part of each conversion. The system handles a number of critical network and system failures that may occur during the upgrade procedure and allows the user to restart the upgrade procedure and complete the upgrade. If failures occur during the conversion procedure, there is also a mechanism which allows for a rollback to the prior setup or for completion of the partially completed conversion procedure.

The present invention operates in the context of a data communication network including multiple network elements. The network may be a SONET/SDH network and a network element may be a terminal multiplexer, an add-drop multiplexer (ADM), an optical crossconnect (OXC), a signal regenerator, router, switch, or other optical node interface, for example. The system and method described herein may be incorporated, for example, into an optical transport platform, such as ONS 15327, 15454, or 15455 available from Cisco Systems, Inc.

Figure 1A:
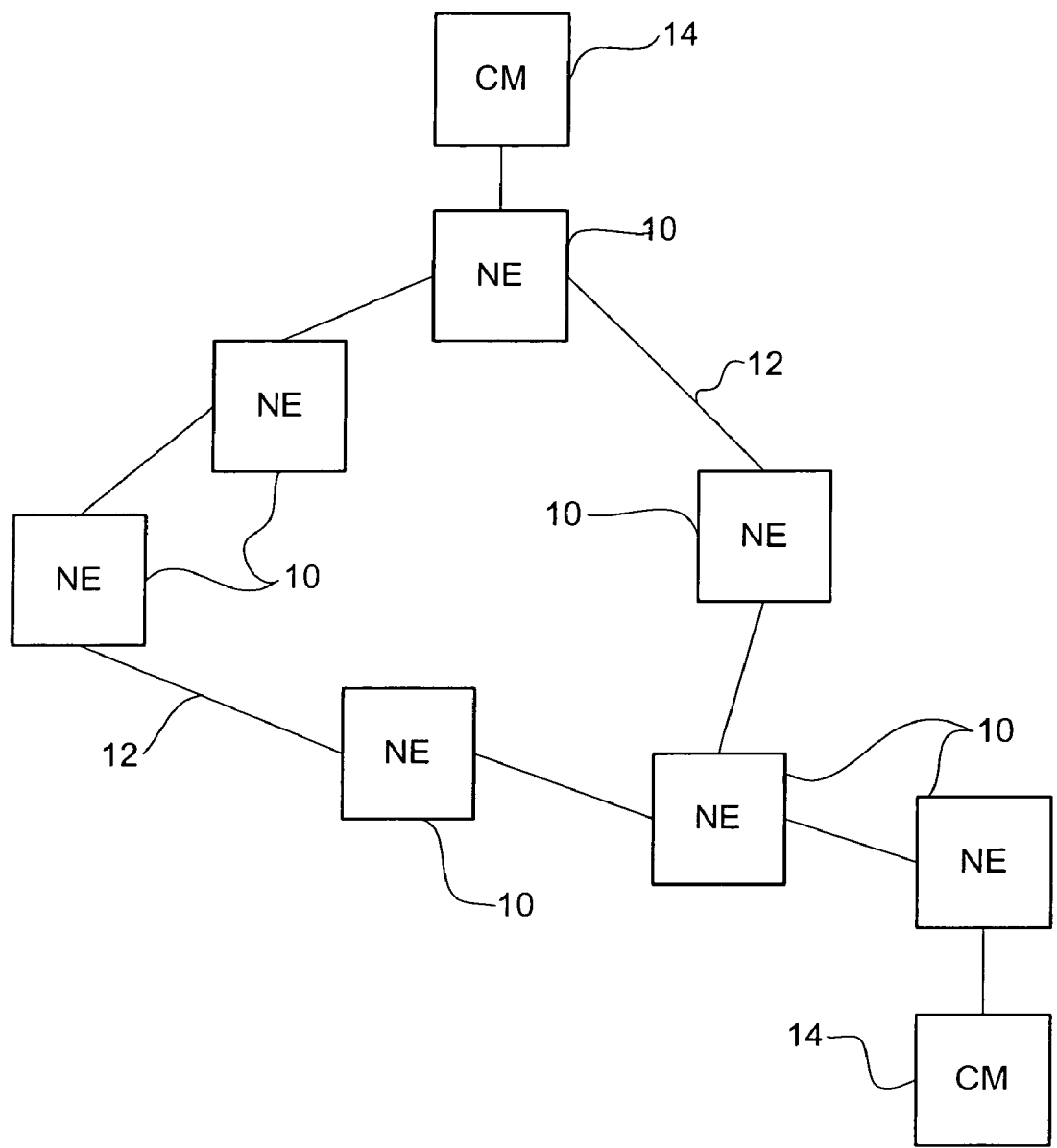
FIG. 1A is a block diagram of a network according to one embodiment of the present invention.

Referring now to the drawings, and first to FIG. 1A, an example of a network that may be used in the present invention is shown. The network includes nodes (also referred to as network elements or NEs) 10 interconnected by links (spans) 12. A network circuit can traverse one or more NEs 10. Each intermediate NE 10 performs a cross connect function, connecting the circuit data from one link to another to deliver data to a destination. A conversion manager (CM) 14 runs on a computer connected to a NE 10. The conversion manager may operate, for example, on a computerized network management system (NMS). The network shown in FIG. 1A may be, for example, a SONET network managed via one or more network management stations. The network shown may be part of a larger SONET/SDH network. The network elements 10 are interconnected by optical fiber links 12 which include an optical fiber cable or multiple cables connected serially, as is well known by those skilled in the art. The network elements 10 may be interconnected by more than one link 12. Each link 12 carries one or more transport signals, (e.g., STS (Synchronous Transport Signals).

The conversion manager 14 may run on separate computers attached to NEs 10, as shown in FIG. 1A. A network may include several conversion manager systems 14 running concurrently on the same or different computers, connected to the same or different NEs 120. It is to be understood that the network shown in FIG. 1A is only one example and that the system and method disclosed herein may be used in various types of network configurations without departing from the scope of the invention.

Figure 1B:
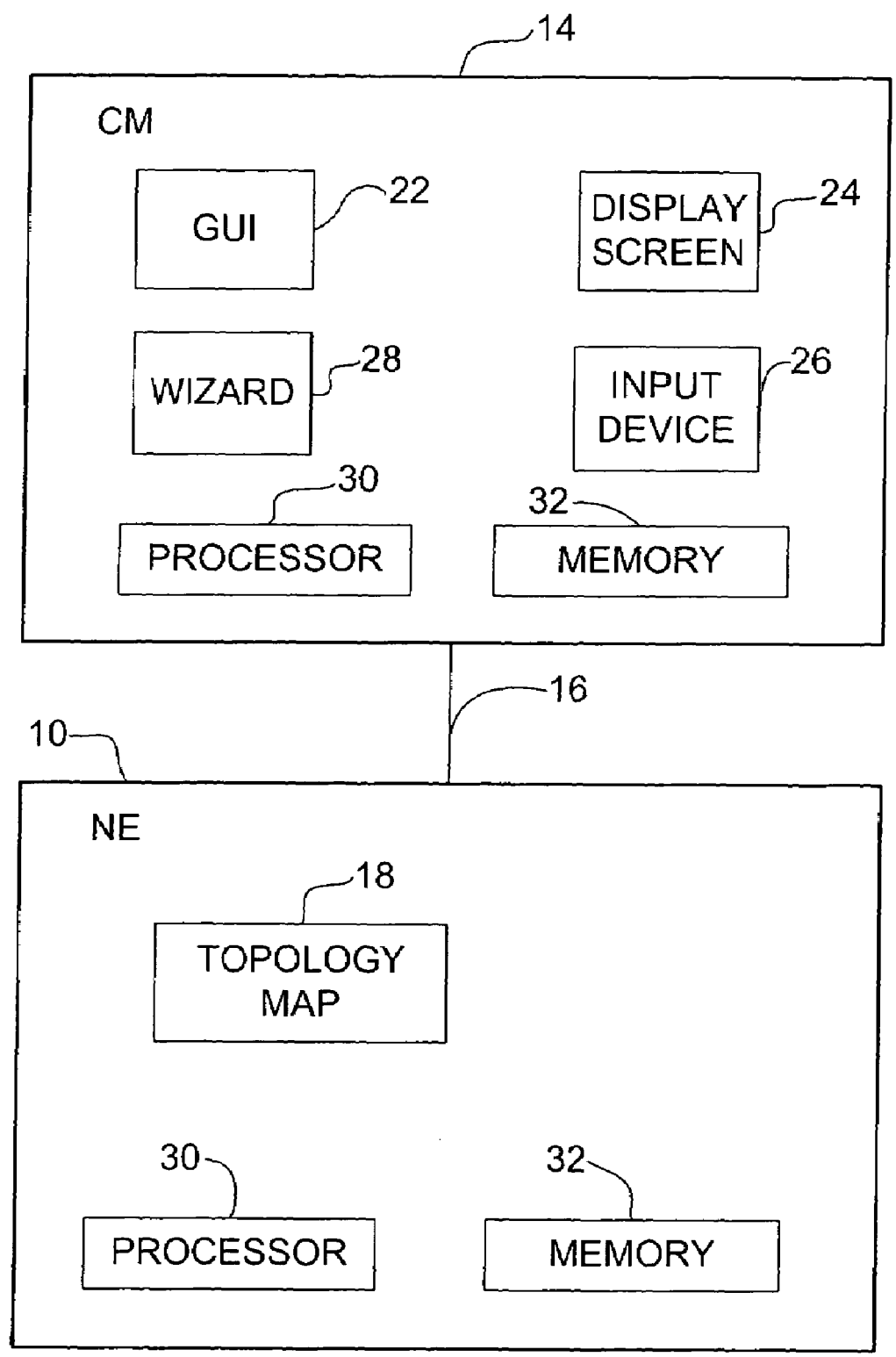
FIG. 1B is a block diagram of a conversion manager and network element according to one embodiment of the present invention.

The conversion manager 14 may be connected to the NE 10 by an Ethernet link 16 or some other interface (e.g., serial port, wide area network, wireless connection, or other suitable interface as is well known by those skilled in the art) (FIG. 1B). The conversion manager 14 queries the NEs 10 for the state of their cross-connects or other circuit information stored at the NEs. This operation may be performed in the same manner that a NMS gathers information from NEs, for example. The conversion manager 14 receives topology information (e.g., topology map) 18 from the NEs 10 and each NE preferably maintains a list of all the conversion manager systems registered with the NE. As the conversion manager 14 receives pieces of cross-connect and circuit information from the NEs 10, the conversion manager splices these pieces together and constructs representations of network circuits in a form which makes it easy for a user to trace each circuit from its source NE through intermediate NEs to a destination. A graphical user interface (GUI) module 22 displays the circuits on a computer screen 24. Input device 26 (e.g., keyboard, mouse) allows the user to issue commands via the GUI 22 to configure circuits in the network. The GUI module 22 may include, for example, an HTTP browser executing a Java applet loaded from one of the NEs 10. The browser provides the user interface, and the applet may implement various functions. A wizard 28, described in detail below, may be used to guide a user through a network upgrade using the system of the present invention. The wizard 28 is described herein as being run on a conversion manager 14, however, it is to be understood that the wizard may be run on a user computer that operates as a typical NMS or any other network device that is in communication with the circuits to be upgraded and contains information regarding the circuits and connecting nodes.

The conversion manager (user) computer 14, may be a stand-alone desktop computer, laptop computer, or other suitable communication device. The computer may include, for example, a CTC (Cisco Transport Controller), available from Cisco, Systems, Inc. or other sub-network interface tool that can be used for node control. The conversion manager 14 may be implemented by object oriented software using CORBA (Common Object Request Broker Interface) or other appropriate software. The NE 10 and conversion manager 14 include a processor 30 and memory 32 and may be implemented on a computer system such as described below with respect to FIG. 28, for example.

The method and system described herein is used to upgrade (modify, convert) various types of circuits. After the upgrade is performed, the circuit may have the same paths, bandwidth, and source and destination nodes, or one or more of these may be changed. The upgraded circuit may or may not have a new topology. While in a preferred embodiment, the upgraded circuit has increased protection (e.g., unprotected circuit changed to a protected circuit or a UPSR changed to a BLSR), it is to be understood that the upgraded circuit may also have less protection than the original circuit. The upgrade is performed without losing traffic on existing circuits (i.e., network traffic is not affected for any significant amount of time). The network nodes and links may be reconfigured during the upgrade and the type of protection used may be changed. The system and method may be used, for example, to upgrade a linear circuit (i.e., network configuration that has no rings for protection and all network links are either unprotected or 1+1 protected) to a UPSR (unidirectional path switched ring) or BLSR (bi-directional line switched ring) or upgrade a UPSR/SNCP (sub-network connection protection) to a 2F-BLSR/MSSP (multi-service switching platform)). A 2F-BLSR/MSSP may also be converted to a 4F-BLSR/MSSP. The system may also be used to add or delete nodes to or from a circuit and merge rings with unprotected circuits or other rings.

More specifically, the following conversions may be performed: linear unprotected circuit to UPSR/SNCP; linear 1+1 to BLSR/MSSP; linear 1+1 to 2F-BLSR/MSSP; linear 1+1 to 4F-BLSR/MSSP; UPSR/SNCP to 2F-BLSR/MSSP; UPSR/SNCP to 4F-BLSR/MSSP; and 2F-BLSR/MSSP to 4F-BLSR/MSSP. The system may also be used to delete nodes, add nodes, or merge rings. For example, the following modifications to circuits may be performed: add node to BLSR/MSSP; delete node from BLSR/MSSP; add node to UPSR/SNCP/PPMN (Path Protected Mesh Network); delete node from UPSR/SNCP/PPMN; add node to linear 1+1; delete node from linear 1+1; and merge UPSR/SNCP rings. The following provides specific examples of some of these circuit conversions. It is to be understood that the circuit modifications (upgrades, conversions) described herein are only provided as examples and that different circuit modifications may be implemented without departing from the scope of the invention.

The first conversion example is a linear 1+1 protected topology with 2 or more nodes into a UPSR/SNCP topology. The UPSR may be a bi-directional connection with one bi-directional path that is bridged to two paths in one direction, and selects from the same two paths in the other direction. This is a topology-level conversion so that all circuits traversing the topology are affected by this single conversion operation. The conversion of a linear circuit to UPSR/SNCP does not require new spans to be added to the topology. The set of nodes that make up the linear topology under conversion may be only a subset of all the nodes in the network. Thus, only a subset of a network may be converted, rather than the entire network. A given affected circuit may enter the topology at any node and exit at any node. Likewise, a given affected circuit may have a source or destination end point at any node in the topology. Thus, a circuit may start or end from outside the scope of the topology or from within.

Selectors and bridges and their corresponding additional paths are added to the circuit connections without affecting traffic. The number and positioning of network spans in the topology remains unchanged during and after the conversion. The working and protect spans of the 1+1 links become working and protect UPSR links. Thus, a two-way connection with paths A and B is converted to a UPSR connection with paths A, B, and C. A 3-node linear 1+1 topology (A-B-C) becomes a 3-node topology with 2 adjacent interconnected UPSR/SNCP rings: ring AB and ring BC.

Figure 2A:
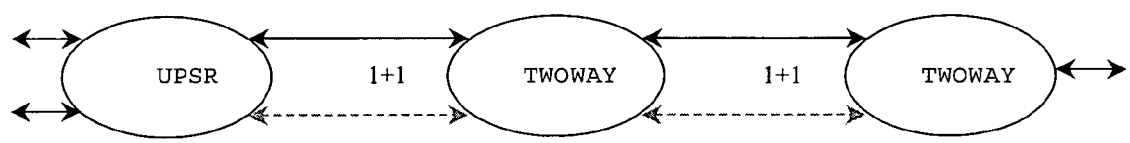
FIG. 2A illustrates a linear 1+1 bi-directional circuit before conversion.
Figure 2B:
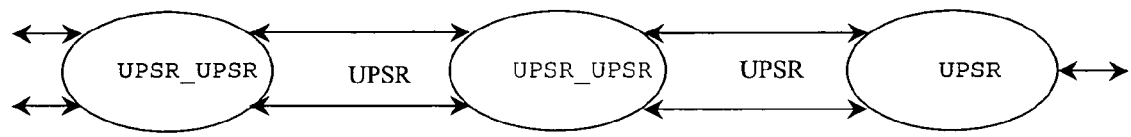
FIG. 2B illustrates a UPSR/SCNP circuit after conversion from the circuit shown in FIG. 2A.
Figure 3:
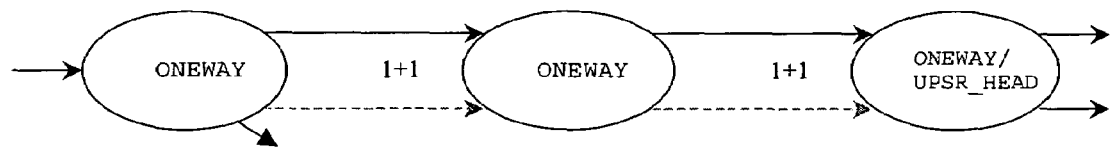
FIG. 3 illustrates a linear 1+1 unidirectional circuit prior to conversion.
Figure 4:
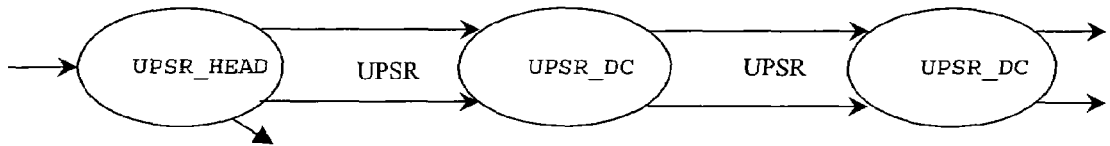
FIG. 4 illustrates a UPSR/SNCP circuit after conversion from the circuit shown in FIG. 3.

FIGS. 2A, 2B, 3, and 4 illustrate a sample conversion of linear 1+1 circuits to a UPSR/SNCP for a bi-directional circuit and unidirectional circuit, respectively. FIGS. 2A and 3 show the topology before the conversion and FIGS. 2B and 4 show the topology after the conversion.

Referring now to FIG. 2A, the original circuit prior to conversion is shown to be a 3-node linear 1+1 segment of a bi-directional circuit. The circuit contains two two-way connections (i.e., a bi-directional connection with two paths). The circuit segment to the left of the two-way connections (as viewed in FIG. 2A) is UPSR protected. It may be the head or drop end of a UPSR/SNCP ring and contains a bi-directional connection with one bi-directional path that is bridged to two paths in one direction and selects from the same two paths in the other direction. As shown in FIG. 2B, the converted circuit includes an interconnection between two UPSR rings (identified in FIG. 2B as UPSR_UPSR) and the head or drop end of a UPSR/SNCP ring (UPSR). In each direction, the two paths flow into a selector whose output path is bridged to two paths.

FIGS. 3 and 4 illustrate conversion of a linear 1+1 unidirectional circuit to a UPSR/SNCP. FIG. 3 shows a 3-node linear 1+1 segment of a unidirectional circuit. The unidirectional circuit may have multiple drops placed anywhere along the circuit path. The linear 1+1 circuit segment is adjacent to a UPSR segment (identified as UPSR_HEAD in FIG. 3). The UPSR_HEAD is the head end of a unidirectional UPSR/SNCP ring and has a unidirectional connection with one input path that is bridged to two (or more) output paths. The circuit may also have two drops coming off of the rightmost node in the segment instead of the UPSR. As shown in FIG. 4, the converted circuit includes a UPSR head end (UPSR_HEAD) and two UPSR drop-and-continue connections (identified as UPSR_DC). The UPSCR_DC is a connection with two bi-directional paths (similar to a two-way connection), but each path also flows to a selector. The selector has one (or more) unidirectional output paths.

The linear circuit to UPSR/SNCP conversions described above involve altering multiple connections along the circuit path of each affected circuit. If a failure occurs which interrupts the conversion process, the system will allow the user to undo the partial conversion or finish the conversion process. In order to provide this error recovery, state is maintained at each node (connection) during the conversion process, as described in detail below.

The next conversion example is a linear unprotected circuit to a UPSR/SNCP. This conversion is similar to the linear 1+1 to UPSR/SNCP conversion discussed above, except that the alternate UPSR/SNCP path is not explicitly defined by 1+1 protect spans. Thus, an alternate route must be calculated. The conversion is preferably performed only at the circuit level, with only one circuit being converted at a time. An alternate path for the circuit under conversion is preferably routed automatically by the system, but may also be routed manually by the user. Once the route is obtained, circuit connections are created on any intermediate nodes in the alternate path. Existing circuit connections on the original circuit path are modified, as in the case of linear 1+1 to UPSR/SNCP upgrades described above.

Figure 5:
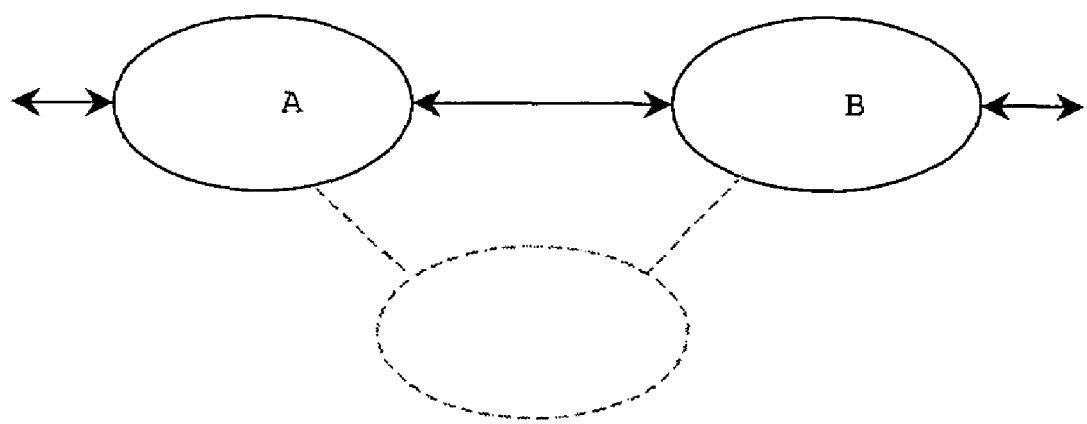
FIG. 5 illustrates a linear unprotected circuit prior to conversion.
Figure 6:
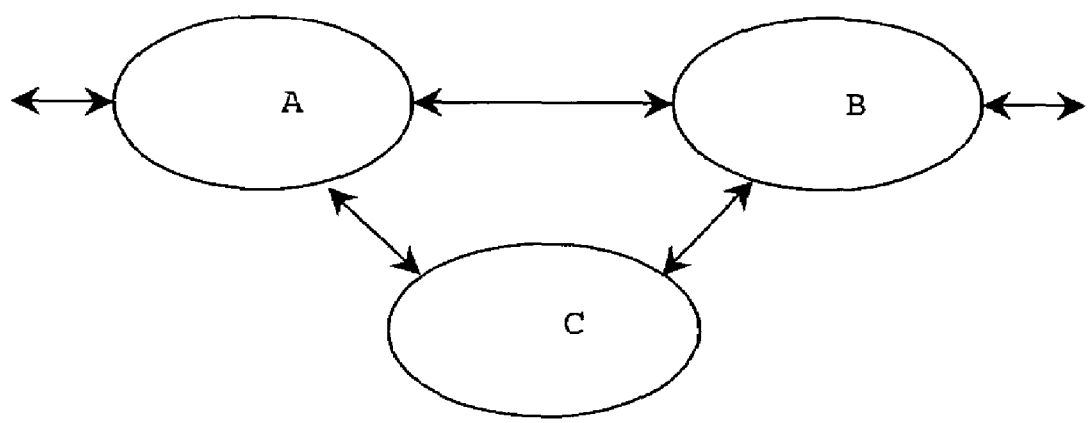
FIG. 6 illustrates a UPSR/SNCP circuit after conversion from the circuit shown in FIG. 5.

FIGS. 5 and 6 illustrate an unprotected circuit to UPSR/SNCP conversion. A linear unprotected segment from node A to node B (FIG. 5) is converted to a UPSR/SNCP made up of nodes A, B, and C (FIG. 6). The conversion is performed by adding an alternate route through existing node C (shown in phantom in FIG. 5), which is added to the circuit (FIG. 6).

Figure 7:
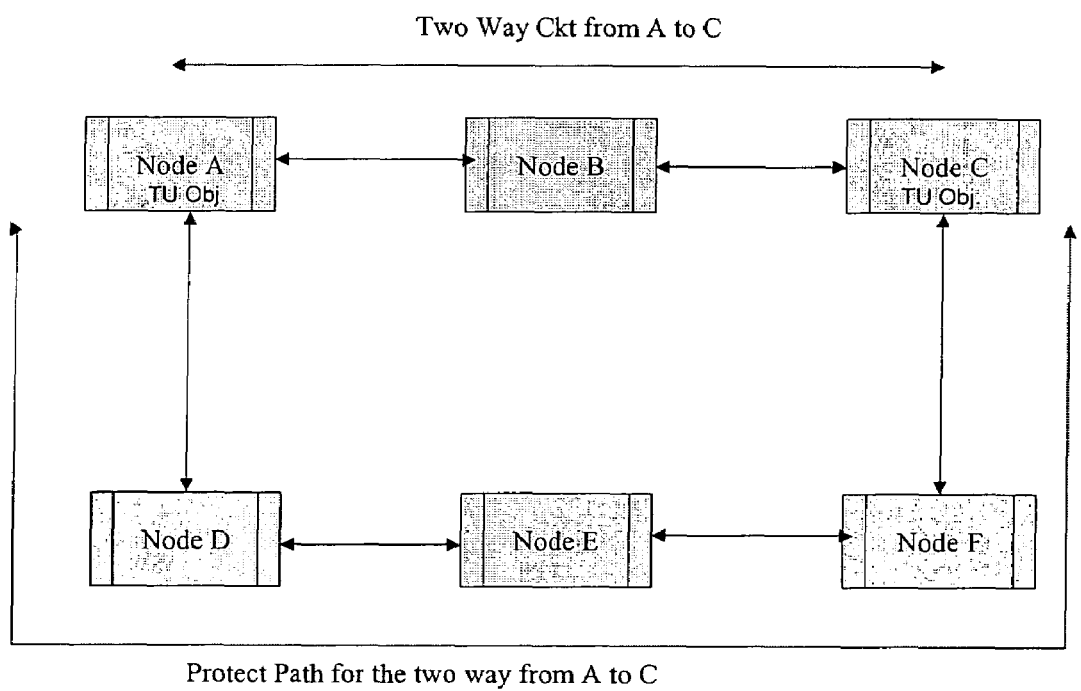
FIG. 7 illustrates location of topology upgrade objects during conversion from an unprotected two-way circuit to UPSR.

In order to provide for error recover during conversion of an unprotected circuit to a UPSR, the nodes within the circuit are provided persistent topology (circuit) upgrade objects to store the state of an in service topology (circuit) upgrade. These topology upgrade objects help the client to recover upon a loss of connection or an abnormal termination of the client. FIG. 7 illustrates how the topology upgrade objects, during conversion from an unprotected two-way circuit to UPSR, are created at only some of the nodes within the circuit. FIG. 7 shows a network having a two way circuit from node A to node C (through node B) and a new protect path for the two way circuit from node A to node C (through nodes D, E, and F). The topology upgrade objects (TU Obj.) are created only on nodes A and C. If the conversion process is terminated before it is completed (e.g., by the client or due to a system, network, or link failure), the topology upgrade objects will save the last state. These objects will show if the topology upgrade was completed on these nodes. If even one of the objects (on different nodes) has been converted then the client can proceed with the topology upgrade for the rest of the objects. If none of these objects are converted then the client can delete all the topology upgrade objects and restart the upgrade.

Figure 8:
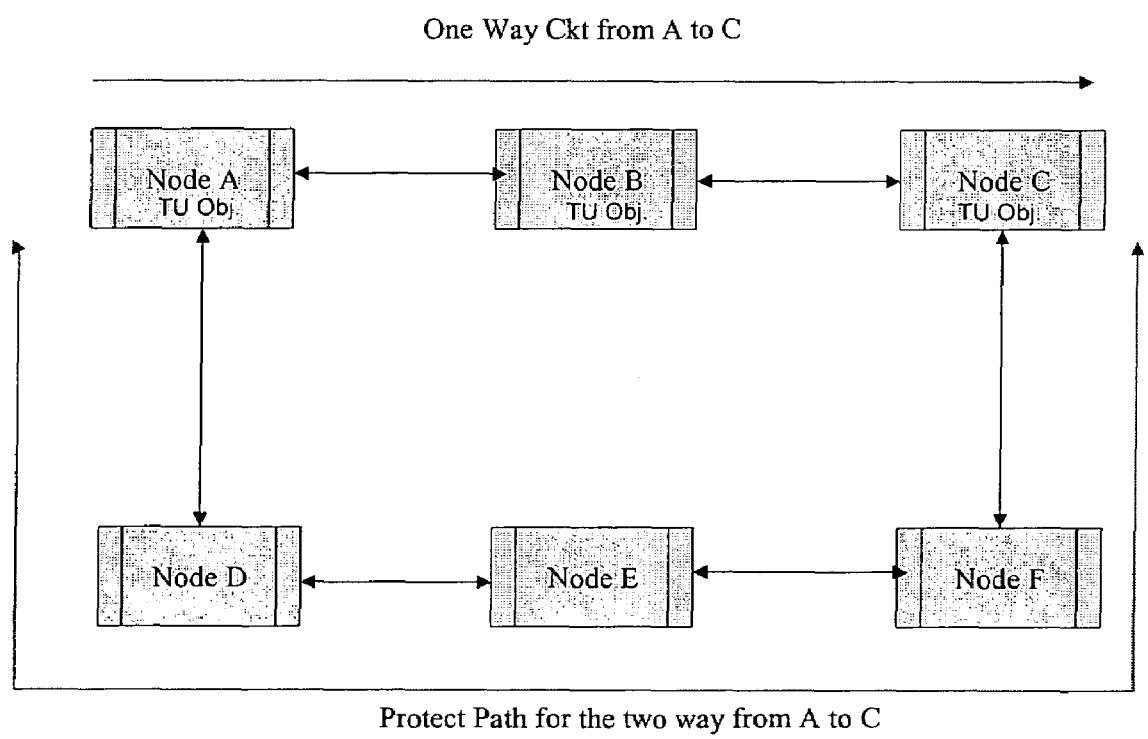
FIG. 8 illustrates location of topology upgrade objects during conversion from an unprotected one-way circuit to UPSR.

FIG. 8 illustrates upgrade from an unprotected one-way circuit to a UPSR. The network is similar to the one shown in FIG. 7, except that the path from node A to node C is a one-way circuit. In this example, the topology upgrade objects are created on nodes A, B, and C.

Figure 9:
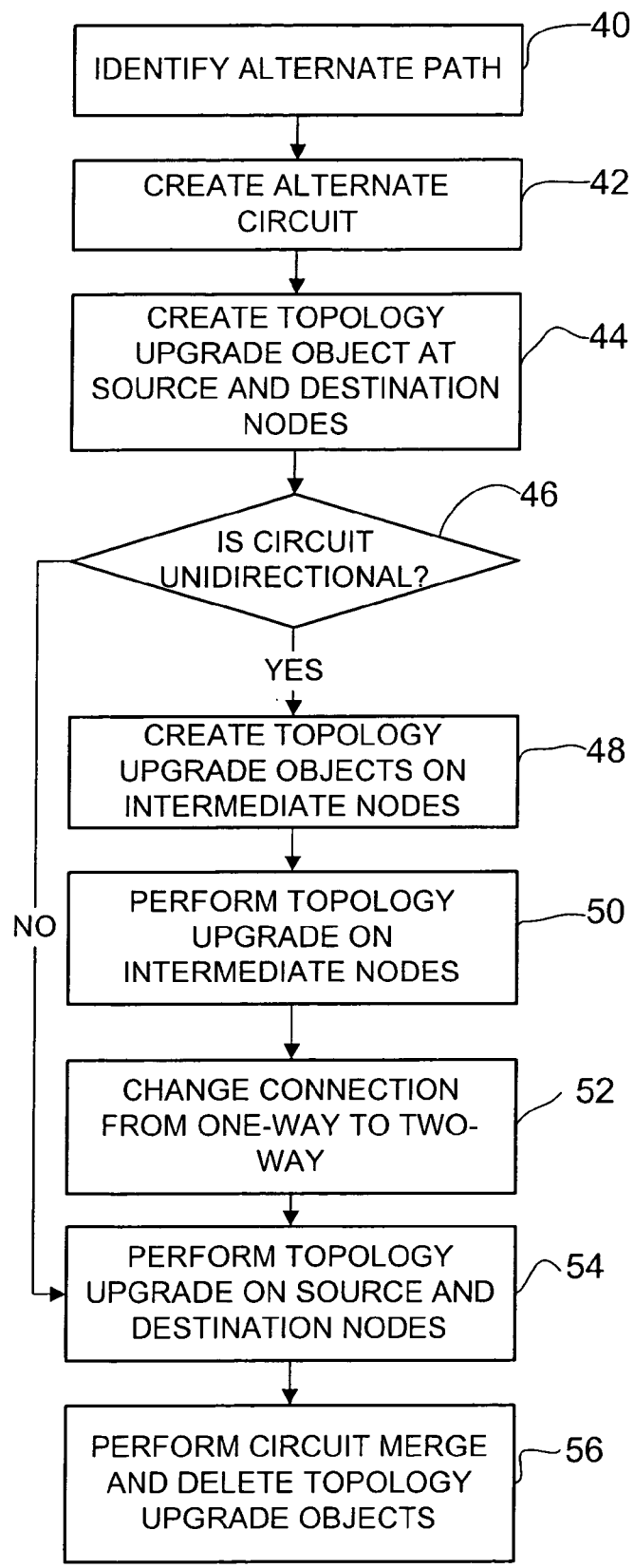
FIG. 9 is a flowchart illustrating a process for upgrading an unprotected circuit to UPSR.

FIG. 9 is a flowchart illustrating a process of the present invention for converting a linear unprotected circuit to UPSR/SNCP. At step 40, an alternate path is first identified. An alternate circuit is then created (step 42). A topology upgrade object is created on source and destination nodes (step 44). The object on the source node is set at PENDING_CREATE and the object on the destination node is set at PENDING_UPGRADE. If the circuit is unidirectional then a topology upgrade object is created on intermediate nodes along the existing circuit path between the source and destination nodes and the source node topology upgrade object state is changed from PENDING_CREATE to PENDING_UPGRADE (steps 46 and 48). If the circuit is unidirectional then a topology upgrade is performed on intermediate nodes along the existing circuit path (step 50) and the connection is changed from one-way to two-way (step 52). A topology upgrade is performed on the source and destination nodes at step 54. A circuit merge is performed and the topology upgrade objects are deleted on the source and destination nodes (step 56).

The following describes conversion of a linear 1+1 circuit to BLSR/MSSP. A linear 1+1 network with 2 or more nodes can be converted to a 2F-BLSR/MSSP or 4F-BLSR/MSSP network. Conversion of a linear 1+1 to 4F-BLSR/MSSP requires more spans to be added than conversion to a 2F-BLSR/MSSP. The circuit connections (cross-connects) need not be modified at the NE since the circuit path and its connections do not change, only the underlying line-level protection changes.

Next, examples are provided for conversion of UPSR/SNCP to BLSR/MSSP. During UPSR to BLSR conversion, all circuits on a given ring are automatically converted. For example, when a UPSR/SNCP ring is converted to 2F-BLSR/MSSP the arrangement of the ring nodes and spans remains unchanged. Circuits are converted from path protection to line protection. Only a primary path through the ring is needed, so the alternate UPSR/SNCP path is removed. This is a topology-level conversion so that all circuits traversing the topology are affected by this single conversion operation. The set of nodes that make up the UPSR/SNCP topology under conversion may be only a subset of all the nodes in the network. Thus, it is not the entire network that is being converted, but only a specific subset of the network. A given affected circuit may enter the topology at any node and exit at any node. Likewise, a given affected circuit may have a source or destination endpoint at any node in the topology, thus, a circuit may start or end from outside the scope of the topology or from within.

Circuit connections with bridges and selectors are modified at the NE. Selectors and bridges and their corresponding additional paths are removed from the circuit connections (without affecting traffic). For example, a UPSR connection with paths A, B, and C will be converted to a two-way connection with paths A and B. Also, for unidirectional circuits, two-way connections are converted to one-way connections. If the UPSR/SNCP rings are not explicitly defined, the rings must first be identified for the conversion takes place.

Figure 10:
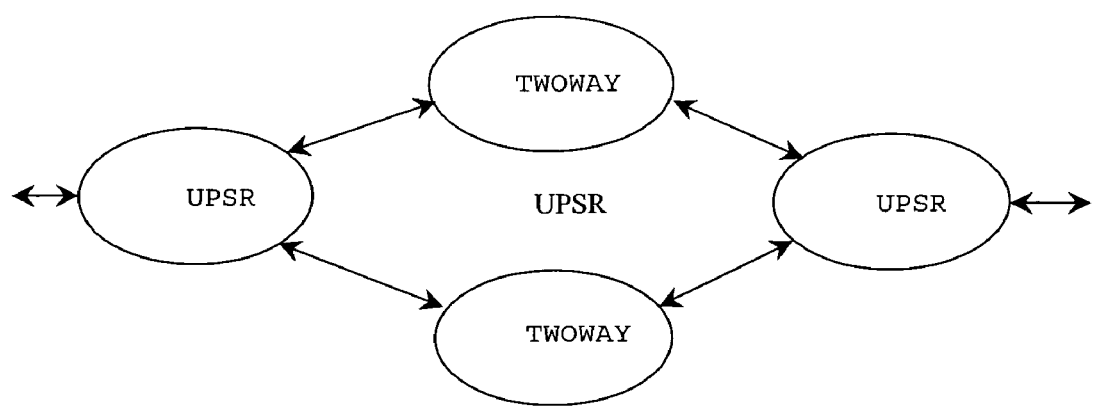
FIG. 10 illustrates a UPSR/SNCP bi-directional circuit prior to conversion.
Figure 11:
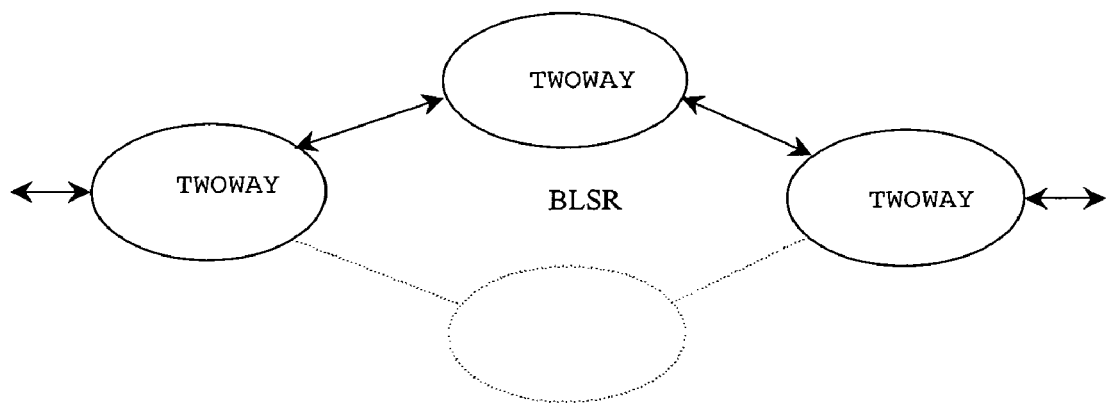
FIG. 11 illustrates a BLSR/MSSP circuit after conversion from the circuit shown in FIG. 10.
Figure 12:
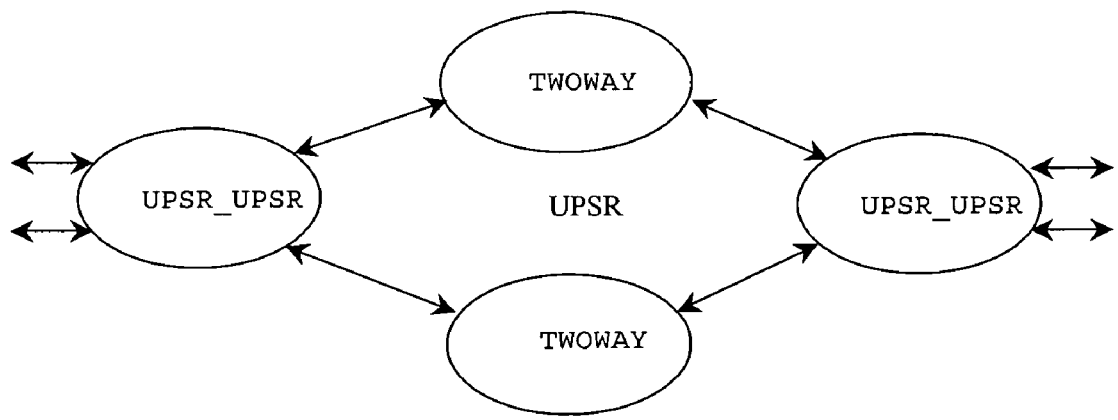
FIG. 12 illustrates a UPSR/SNCP bi-directional circuit with UPSR/SNCP prior to conversion.
Figure 13:
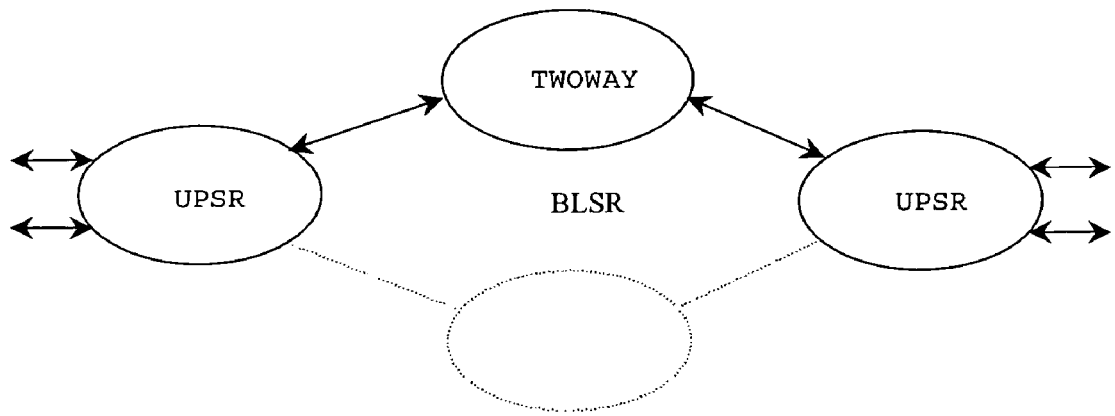
FIG. 13 illustrates a BLSR/MSSP circuit after conversion from the circuit shown in FIG. 12.
Figure 14:
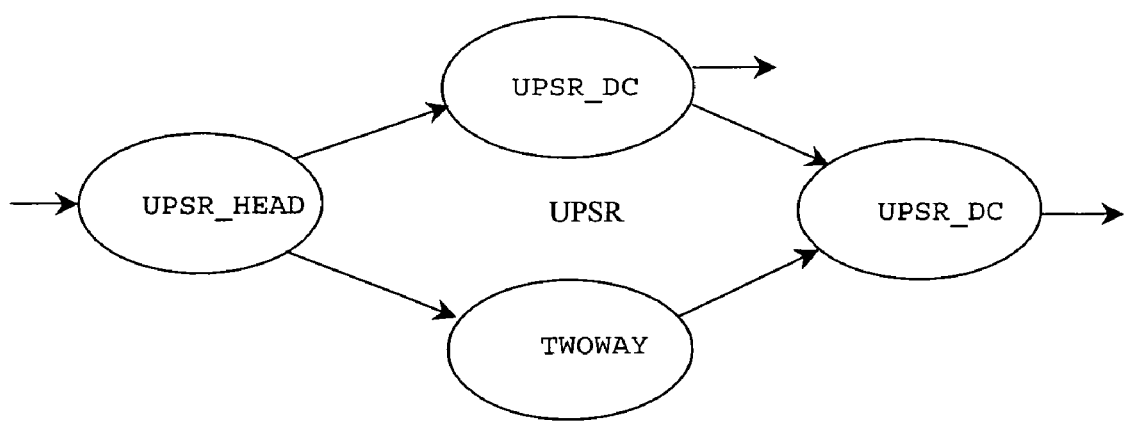
FIG. 14 illustrates a UPSR/SNCP circuit prior to conversion.
Figure 15:
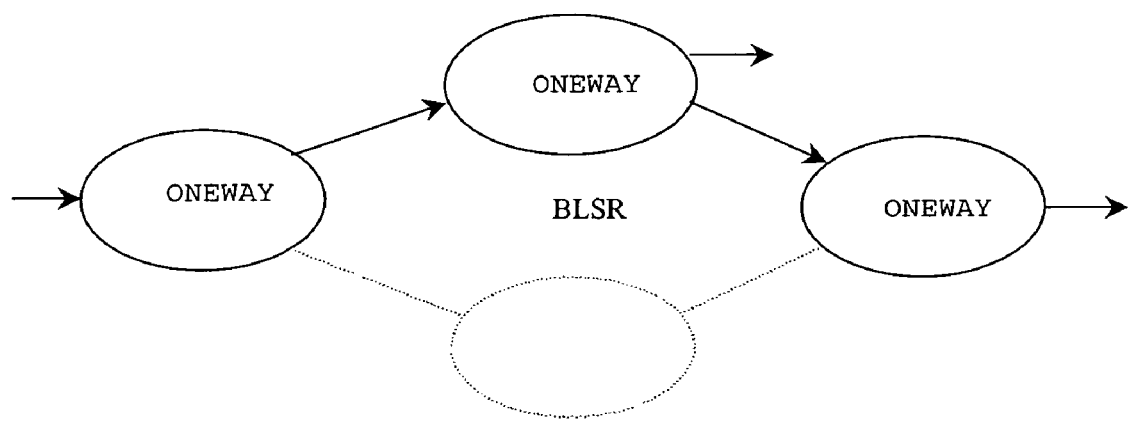
FIG. 15 illustrates a BLSR/MSSP unidirectional circuit after conversion from the circuit shown in FIG. 14.
Figure 16:
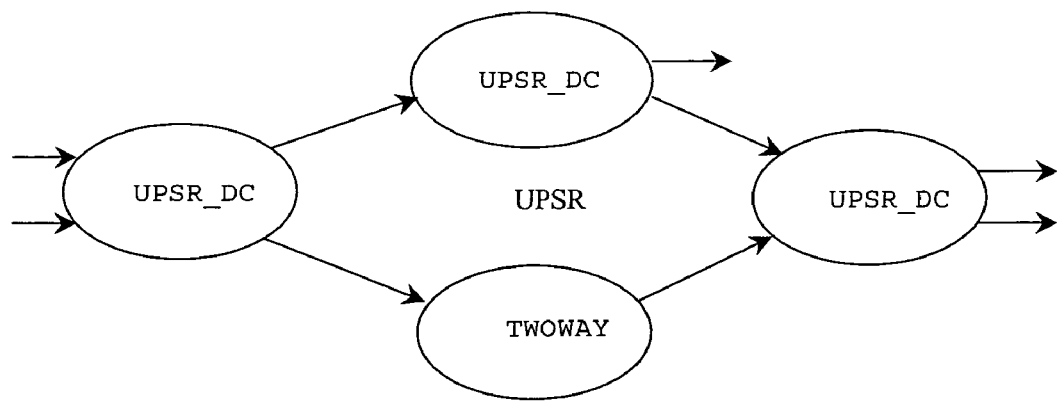
FIG. 16 illustrates a UPSR/SNCP circuit prior to conversion.
Figure 17:
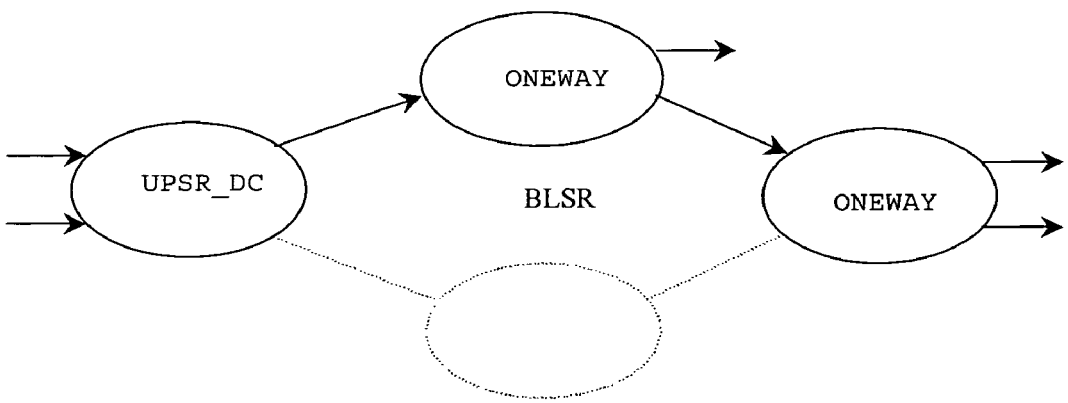
FIG. 17 illustrates a BLSR/MSSP circuit with UPSR/SNCP after conversion from the circuit shown in FIG. 16.

FIGS. 10-17 illustrate examples for converting UPSR to BLSR. FIGS. 10 and 11 illustrate UPSR/SNCP to BLSR/MSSP conversion for a bi-directional circuit. FIGS. 12 and 13 illustrate UPSR/SNCP to BLSR/MSSP conversion for a bi-directional circuit extending to other UPSR rings. FIGS. 14 and 15 illustrate UPSR/SNCP to BLSR/MSSP conversion for a unidirectional circuit. FIGS. 16 and 17 illustrate UPSR/SNCP to BLSR/MSSP conversion for a unidirectional circuit extending to other UPSR rings. FIGS. 10, 12, 14, and 16 show the topology before the conversion and FIGS. 11, 13, 15, and 17 show the topology after the conversion is performed. In a UPSR/SNCP to BLSR/MSSP conversion, the shorter path is retained and connections and UPSR selectors on the other path are removed (FIGS. 10-17).

Conversion of UPSR/SNCP to 4F-BLSR/MSSP is similar to converting a UPSR/SNCP ring to 2F-BLSR/MSSP. However, more spans (fibers) must be added to achieve a 4-fiber ring.

As discussed above, the conversion process for UPSR/SNCP to BLSR/MSSP involves altering multiple connections along the circuit path of each affected circuit. If a failure occurs, which interrupts the conversion process, the system provides a mechanism by which the partial conversion can be reversed or completed. In order to provide for error recovery, the state at each node (connection) is preferably retained during the conversion process.

Figure 18:
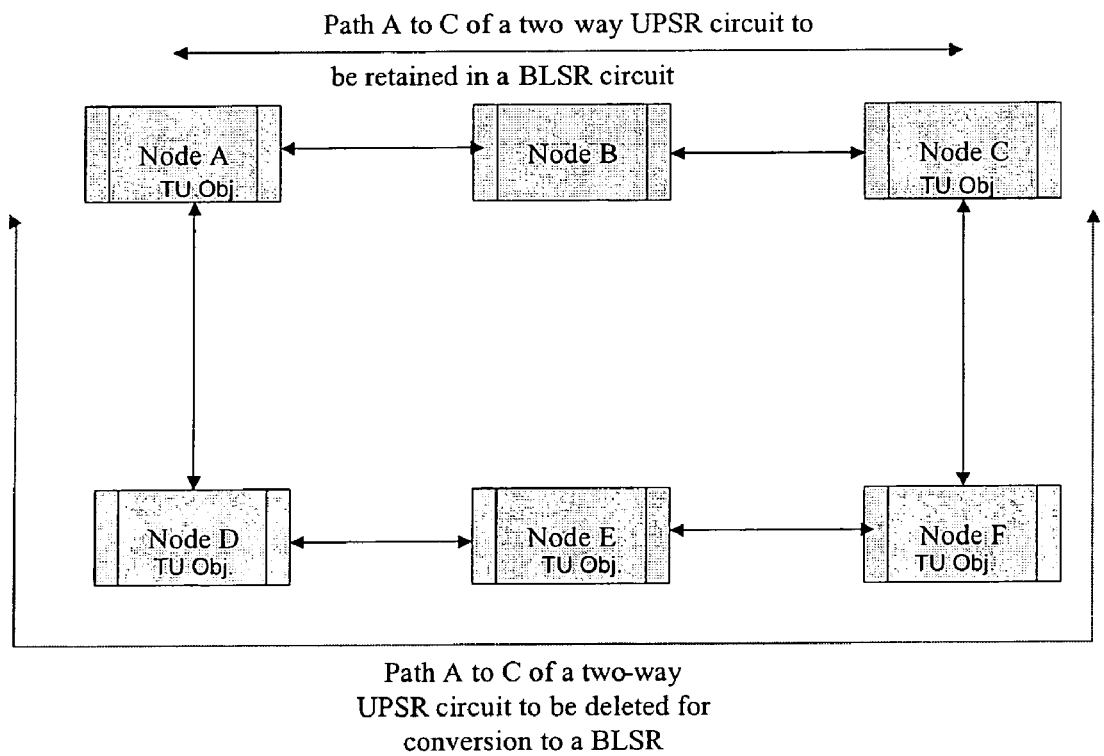
FIG. 18 illustrates location of topology upgrade objects during conversion from a UPSR two-way circuit to BLSR.

FIG. 18 illustrates location of topology upgrade objects for conversion from a UPSR two-way circuit to BLSR. The network shown in FIG. 18 includes a two-way UPSR circuit from node A to node C (through node B), which is to be retained in the BLSR circuit, and a two-way UPSR circuit from node A to node C (through nodes D, E, and F), which will be deleted in the BLSR conversion. The topology upgrade objects are created on the nodes that are part of the UPSR path that needs to be deleted or modified (i.e., path A-D-E-F-C).

Figure 19:
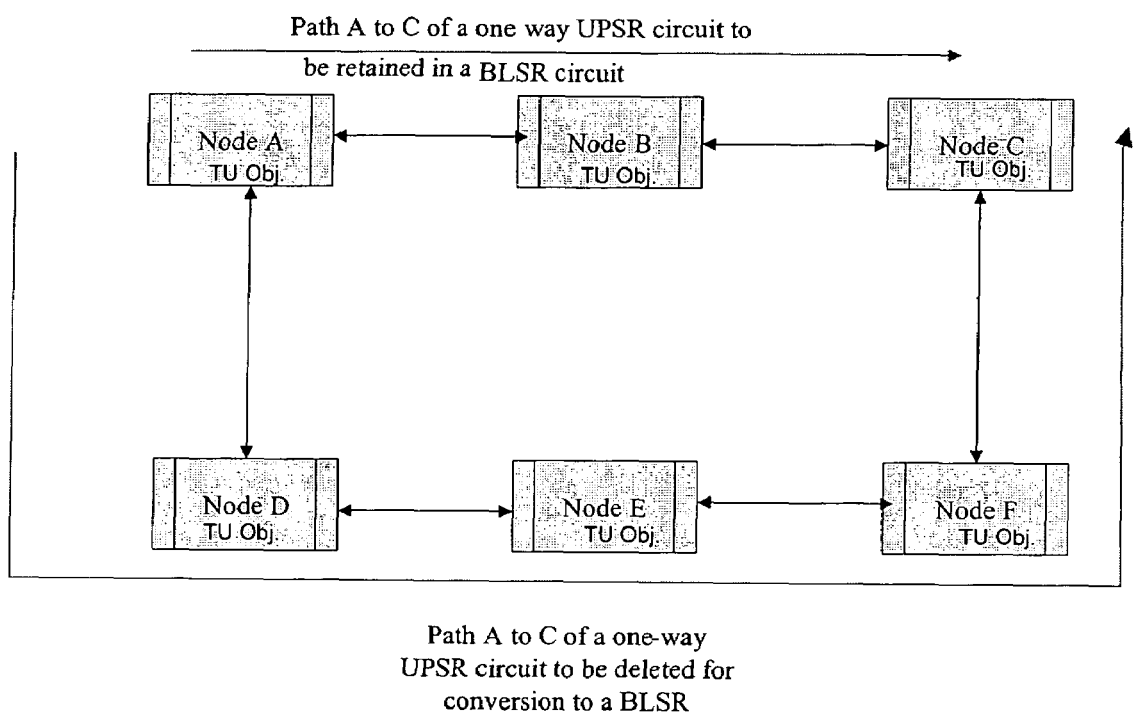
FIG. 19 illustrates location of topology upgrade objects during conversion from a UPSR one-way circuit to BLSR.

FIG. 19 shows the locations of the topology upgrade objects for a UPSR one-way circuit to BLSR conversion. The path from node A to node C (through node B) of the one-way UPSR circuit is retained in the BLSR circuit. The path from node A to node C (through nodes D, E, and F) of the one-way UPSR circuit is deleted during the BLSR conversion. The topology upgrade objects are created on all the nodes. The topology upgrade object is created on node B since the connection type changes from two-way to one-way.

Figure 20:
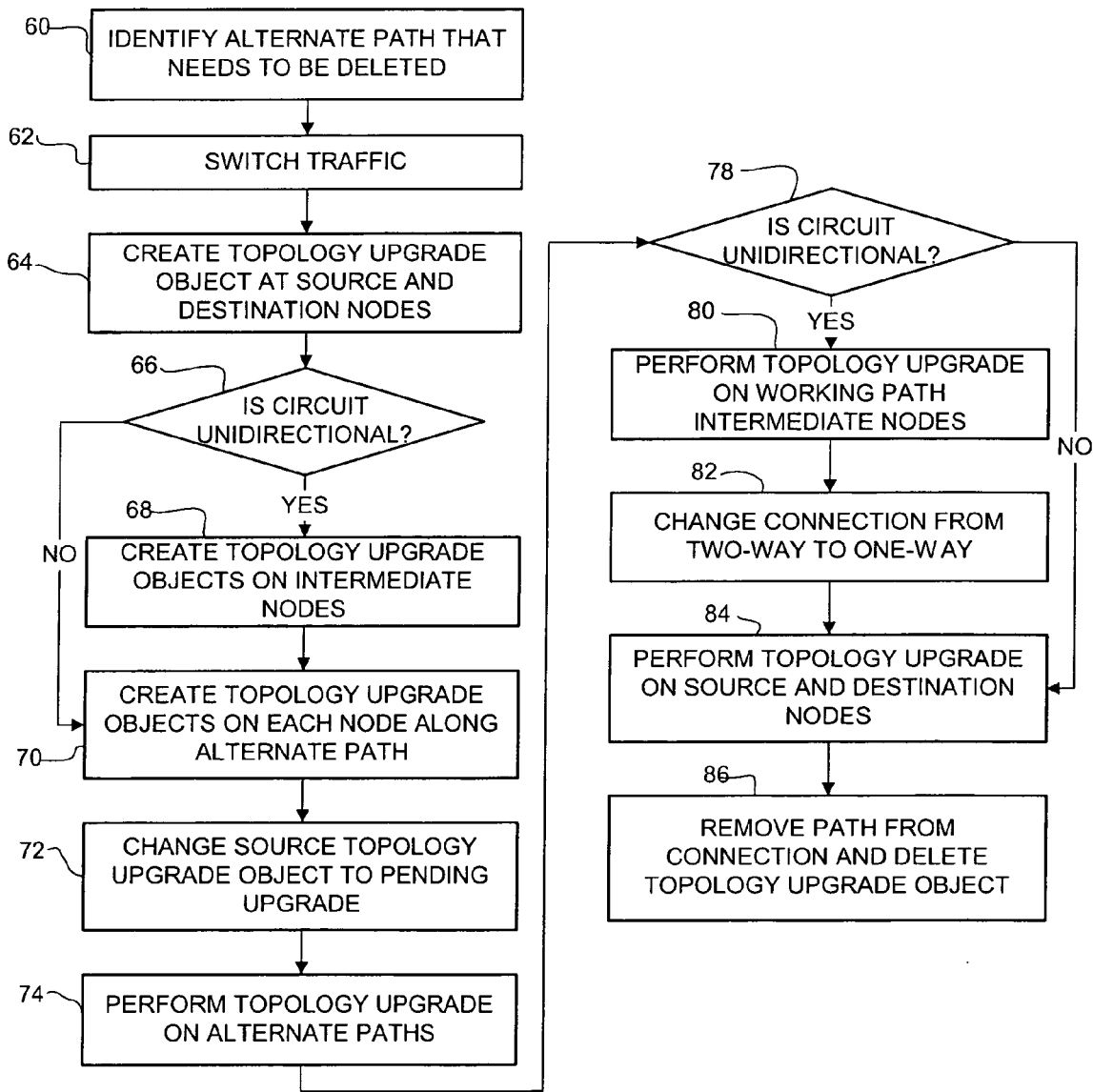
FIG. 20 is a flowchart illustrating a process of the present invention for converting UPSR to BLSR.

FIG. 20 is a flowchart illustrating a process of the present invention for converting UPSR to BLSR. At step 60, an alternate path that needs to be deleted is first identified. The traffic on the identified path is then switched to other paths (step 62). Topology upgrade objects are created on the source and destination nodes (step 64). The object on the source node is set at PENDING_CREATE and the object on the destination node is set at PENDING_UPGRADE. If the circuit is unidirectional then a topology upgrade object is created on working path intermediate nodes between the source and destination nodes (steps 66 and 68). The states for the objects on the intermediate nodes are set at PENDING_UPGRADE. Topology upgrade objects are created on each node along the alternate path (step 70). The source topology upgrade object state is then changed to PENDING_UPGRADE (step 72). A topology upgrade operation is performed on alternate path nodes at step 74 and the connection is destroyed along with the topology upgrade object. If the circuit is unidirectional, a topology upgrade operation is performed on working path intermediate nodes and the connection is changed from two-way to one-way (steps 78, 80, and 82). A topology upgrade operation is then performed on the source and destination nodes, the path is removed from connection, and the topology upgrade objects are destroyed (steps 84 and 86).

Figure 21:
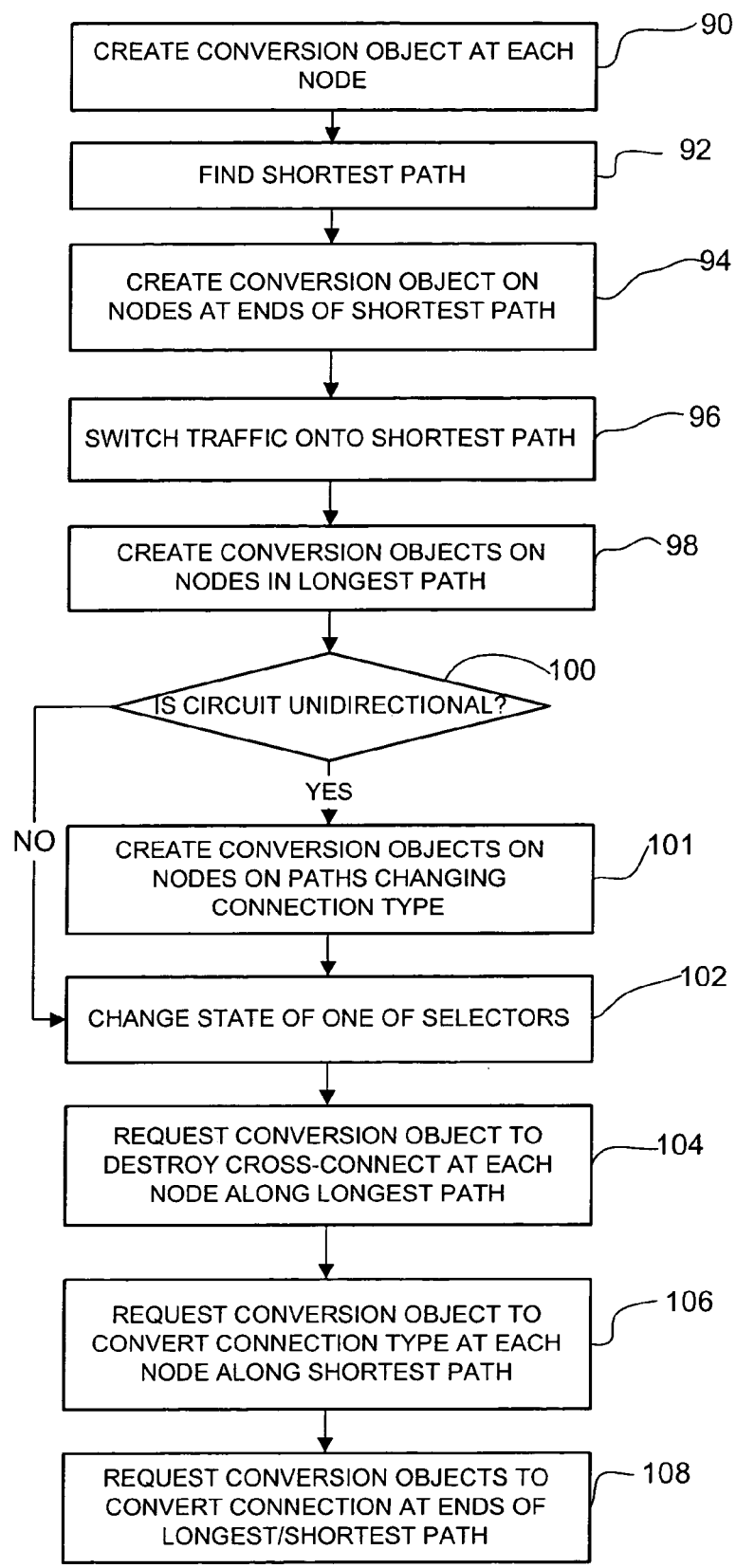
FIG. 21 is a flowchart illustrating a process of the present invention for error recovery during conversion from UPSR to 2F-BLSR.

FIG. 21 is a flowchart illustrating a process of the present invention for error recovery in an UPSR/SNCP to 2F-BLSR/MSSP conversion. A conversion object which has reference to the circuit id, cross-connect, a list of paths after conversion, old connection type, new connection type, and the state of conversion stage, is created on each node (step 90). The shortest paths that the circuit will be converted to are then identified (step 92). On the pair of USPR selectors or bridge that forms the two ends of the shortest paths, a conversion object is created with state set to PENDING_CREATE for one and PENDING_UPGRADE for the other (step 94). A protection operation is performed to switch traffic onto the shortest paths (step 96). Next, going along the longest paths, conversion objects are created on each node in the path with state set to PENDING_UPGRADE (step 98). For a unidirectional circuit, the shortest path is also traversed, for any node on the path that either needs to change the connection type from TWOWAY->ONEWAY or UPSR_DC->ONEWAY, a conversion object is created with the state set to PENDING_UPGRADE (steps 100 and 101). One of the selectors of the pair that has its state set to PENDING_CREATE is revisited and the state is changed to PENDING_UPGRADE (step 102). The connection conversion is then ready to start. Going along the longest paths, each node on the paths requests its conversion object to destroy cross-connect and at the same time destroy itself (step 104). Then going along the shortest paths, each node on the paths that has a conversion object created, requests the conversion object to convert the connection type and to destroy itself (step 106). Finally, the pair of selectors making the ends of longest/shortest paths requests the conversion objects to convert the connection and destroy itself (step 108).

If a failure occurs (e.g., system controller crashes) after step 92, the controller is simply restarted. If the controller crashes after steps 94 or 96, the controller is restarted and one of the selectors should be in the state of PENDING_CREATE. The process can be continued from step 96, if traffic has not been switched to the shortest path completely or from step 98 if switching has been completed. If the controller crashes after step 101, or in the middle of steps 98 or 101, the process continues with steps 100 and 102 until the state of PENDING_CREATE is changed to PENDING_UPGRADE, which marks that error recovery preset has been completed. This is possible since, after restart, one of the selectors remains in the PENDING_CREATE state and the system knows that it has not finished creating conversion objects on the affecting nodes. If the controller crashes on steps 102, 104, 106, or 108, the information can be retrieved and the necessary operations completed (i.e., either destroy connection or modify connection).

The upgrade (conversion) examples described above are preferably performed automatically after receiving user input on the type of upgrade to be performed and identification of the circuits or spans for the upgraded circuit. The system does not require input from the user on modifications for each of the nodes on the circuit. This eliminates the need for manual modification at each node involved in the circuit upgrade and manual checks at each step of the upgrade process. After receiving input from the user, the system automatically performs the upgrade. The automatic upgrade may include pauses to allow confirmation by the user that he wants to continue, or confirmation that no alarms have been raised, for example.

It is desirable to have a GUI and wizard that guide a user through each step and provide a network view of the upgrade. The GUI and wizard provide a network or circuit view of the upgrade so that the user can automatically perform and track the upgrade on the entire circuit rather than having to modify and manually track the upgrade on each individual node. The upgrade may be performed, for example, under control of a CTC, as previously described. For each circuit, the conversion manager system 14 (NMS or user computer) preferably includes circuit information, including for example, circuit name (circuit ID), circuit type (e.g., STS, VT, HOP), circuit size (e.g., STS-1, STS-3, VC4, VT), protection (e.g., unprotected, SNCP), direction (e.g., one-way, two-way), status (e.g., active, discovered), source (source NE of circuit), and destination (destination NE of circuit). The GUI may be configured for example, to display various circuits so that a user can select circuits for the topology conversion.

In one embodiment, the GUI includes a pull down menu that lets the user select the type of conversion or upgrade (e.g., convert UPSR to BLSR or convert unprotected circuit to UPSR). The circuit to be upgraded can then be selected from a list of circuits within the network stored on the user computer. The GUI may also include a window listing routing preferences (e.g., option for reviewing route before upgrade or specifying routing direction). The user can also select whether nodal diversity is required or desired, or request link diversity only. The user is then presented spans to select for the UPSR. After the user selects the spans and instructs the system to perform the upgrade, the conversion is automatically completed.

In another embodiment, the user selects from a pull down menu conversion of SNCP to MS-SPRing or unprotected to SNCP. The user is then presented a window to define the BLSR (MSSPR). For example, the user can specify a 2-fiber or 4-fiber ring, speed (e.g., STM64), ring name (e.g., BLSR1), ring reversion or span reversion. The user is then presented with a graphical overview of the relevant portion of the current network topology and selects the spans for the BLSR (MSSPR). The system then automatically forces traffic to the shortest SNCP paths. If no service affecting alarms are raised, the user can instruct the system to complete the conversion. Traffic may be unprotected for a brief moment during the conversion from UPSR to BLSR, however, this does not significantly affect network traffic.

It is to be understood that the GUI and wizard described herein are only examples, and that different types of wizards or GUIs may be used without departing from the scope of the invention.

Figure 22:
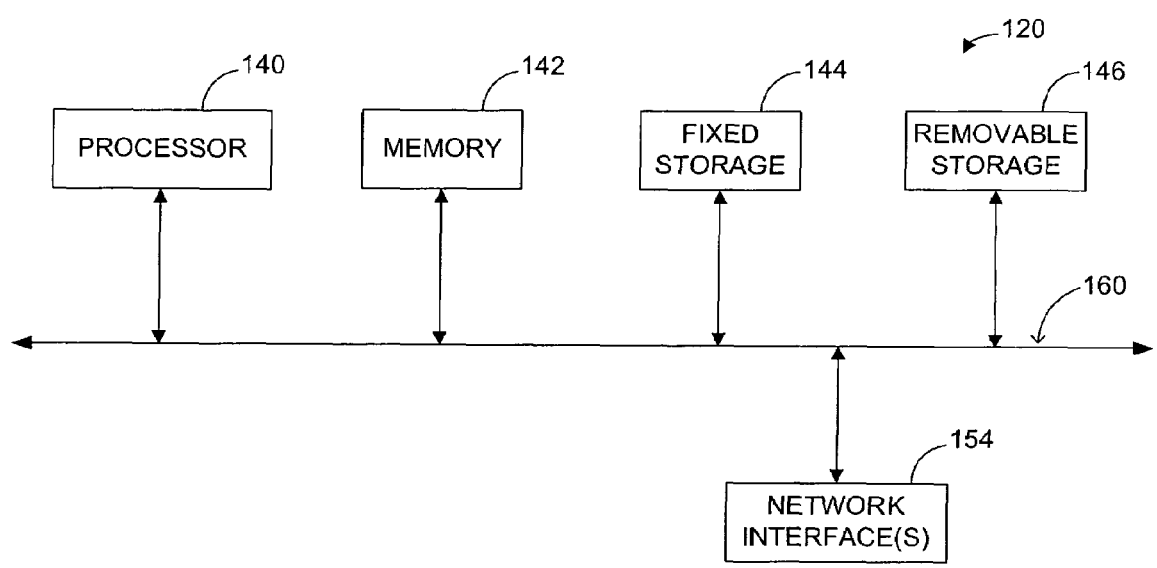
FIG. 22 is a system block diagram of a computer system that can be utilized to execute software of an embodiment of the present invention.

FIG. 22 shows a system block diagram of computer system 120 that may be used to execute software of an embodiment of the invention. The computer system 120 includes memory 142 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 120 further includes subsystems such as a central processor 140, fixed storage 144 (e.g., hard drive), removable storage 146 (e.g., CD-ROM drive), and one or more network interfaces 154. Other computer systems suitable for use with the invention may include additional or fewer subsystems. For example, computer system 120 may include more than one processor 140 (i.e., a multi-processor system) or a cache memory. The computer system 120 may also include a display, keyboard, and mouse (not shown) for use as a host.

The system bus architecture of computer system 120 is represented by arrows 160 in FIG. 22. However, these arrows are only illustrative of one possible interconnection scheme serving to link the subsystems. For example, a local bus may be utilized to connect the central processor 140 to the system memory 142. Computer system 120 shown in FIG. 22 is only one example of a computer system suitable for use with the invention. Other computer architectures having different configurations of subsystems may also be utilized. Communication between computers within the network is made possible with the use of communication protocols, which govern how computers exchange information over a network.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for performing a circuit upgrade in a Synchronous Optical Network (SONET) communication network comprising network elements coupled together to form one or more circuits, the circuit upgrade generated at a node in communication with the circuits and providing increased protection, the method comprising:

providing at the node a list of circuits or spans available for the circuit upgrade;

receiving input from a user identifying at least one existing circuit to be upgraded or at least one span for the upgraded circuit and a type of upgrade to be performed; and automatically performing the circuit upgrade to increase protection of said existing circuit, the upgraded circuit comprising a unidirectional path switched ring (UPSR) or a bi-directional line switched ring (BLSR), wherein automatically performing the circuit upgrade comprises:

identifying an alternate path for use in the circuit upgrade;

creating an upgrade object at a source node and a destination node in the circuit to be upgraded and at least one node in said alternate path, said upgrade object comprising a state of a process of the circuit upgrade and old and new connection types identifying the network element connection types before and after the circuit upgrade; and changing said state of at least one of said upgrade objects.

2. The method of claim 1 wherein automatically performing the circuit upgrade comprises performing the upgrade without receiving input from the user on specific modifications for each of the nodes in the one or more circuits.

3. The method of claim 1 wherein automatically performing the circuit upgrade comprises presenting a network view of the circuit prior to and after the circuit upgrade.

4. The method of claim 1 wherein the upgrade is from an unprotected circuit to a UPSR.

5. The method of claim 4 wherein receiving input from a user comprises receiving information on spans selected for the UPSR.

6. The method of claim 1 wherein the upgrade is from a UPSR to a BLSR.

7. The method of claim 1 wherein the upgrade is from a UPSR to a 2F-BLSR.

8. The method of claim 7 wherein all UPSR circuits on a ring are converted to BLSR circuits.

9. The method of claim 1 further comprising receiving an error during the upgrade and either returning the network to its original state or completing the circuit upgrade, based on user selection.

10. The method of claim 1 further comprising utilizing said topology upgrade objects to convert a connection type at the network element.

11. The method of claim 1 further comprising changing a connection from one-way to two-way or from two-way to one-way during the upgrade.

12. The method of claim 1 further comprising presenting a graphical user interface to the user for identifying the circuits or spans and the type of circuit upgrade.

13. The method of claim 12 further comprising running a wizard for presenting options to the user.

14. The method of claim 1 further comprising automatically finding a shortest path for each of the circuits involved in the upgrade.

15. The method of claim 14 further comprising automatically forcing traffic to the shortest path in the circuit upgrade.

16. The method of claim 15 further comprising instructing the user to check for alarms after traffic is forced to the shortest path.

17. The method of claim 1 further comprising receiving input from the user identifying said alternate path.

18. The method of claim 17 wherein the type of circuit upgrade to be performed, the spans for the new circuit, and the alternate path are the only input required by the user.

19. The method of claim 1 further comprising providing continuous service within the network during the upgrade process.

20. The method of claim 1 further comprising performing a circuit merge and deleting said upgrade object.

21. A system for performing a circuit upgrade in a Synchronous Optical Network (SONET) communication network comprising network elements coupled together to form one or more circuits, the conversion being circuit upgrade generated at a node in communication with the circuits and providing increased protection, the system comprising:

a graphical user interface operable to provide to a user at the node a list of circuits or spans available for the circuit upgrade and receive input from a user identifying at least one circuit to be upgraded or at least one span for the upgraded circuit and a type of upgrade to be performed; and a processor operable to automatically perform the upgrade at a circuit level to provide increased protection, wherein automatically performing the circuit upgrade comprises identifying an alternate path for use in the circuit upgrade, creating an upgrade object at a source node and a destination node in the circuit to be upgraded and at least one node in said alternate path, and changing a state of at least one of said upgrade objects, said upgrade object comprising a state of a process of the circuit upgrade and old and new connection types identifying the network element connection types before and after the circuit upgrade;

the upgraded circuit comprising a unidirectional path switched ring (UPSR) or a bi-directional line switched ring (BLSR).

22. The system of claim 21 wherein the processor is operable to automatically perform the upgrade without affecting service within the network.

23. The system of claim 21 wherein the graphical user interface is configured to present a network view of the circuit to the user to allow the user to track the circuit upgrade.

24. The system of claim 21 wherein the circuit upgrade is from an unprotected circuit to a UPSR.

25. The system of claim 21 wherein the circuit upgrade is from a UPSR to a BLSR.

26. The system of claim 21 further comprising an error recovery system configured to allow for completion of the upgrade following an error during the upgrade.

27. The system of claim 26 wherein the error recovery system is operable to create said upgrade objects on one or more of the network elements traversed by one or more circuits being upgraded to identify the state of the circuit throughout the upgrade.

28. The system of claim 21 further comprising a wizard for presenting options to the user.

29. The system of claim 21 wherein said upgrade object further comprises a circuit identifier.

30. The system of claim 21 wherein the circuit upgrade is from a UPSR to a 4F-BLSR.

31. A computer-readable storage medium encoded with a computer program for performing an upgrade in a Synchronous Optical Network (SONET) communication network comprising network elements coupled together to form one or more circuits, the circuit upgrade generated at a node in communication with the circuits and providing increased protection, the computer program comprising:

code for providing at the node a list of circuits or spans available for the circuit upgrade;

code for receiving input from a user identifying at least one existing circuit to be upgraded or at least one span for an upgraded circuit and a type of upgrade to be performed;

code for automatically performing the upgrade to increase protection of said existing circuit, the upgrade circuit comprising unidirectional path switched ring (UPSR) or a bi-directional line switched ring (BLSR), wherein code for automatically performing the circuit upgrade comprises:

code for identifying an alternate path for use in the circuit upgrade;

code for creating an upgrade object at a source node and a destination node in the circuit to be upgraded and at least one node in said alternate path, said upgrade object comprising a state of a process of the circuit upgrade and old and new connection types identifying the network element connection types before and after the circuit upgrade; and code for changing said state of at least one of said upgrade objects.

32. The computer-readable storage medium of claim 31 wherein the computer readable medium is selected from the group consisting of CD-ROM, floppy disk, zip disk, tape, flash memory, system memory, and hard drive.

33. The computer-readable storage medium of claim 31 wherein the upgrade is from an unprotected circuit to a UPSR.

34. The computer-readable storage medium of claim 31 wherein the upgrade is from a UPSR to a BLSR.

35. The computer-readable storage medium of claim 31 further comprising code that runs a wizard on the node for presenting options to the user.

36. The computer-readable storage medium of claim 31 further comprising code that presents a network view of the upgrade to the user at the node to allow the user to track the upgrade.

37. The computer-readable storage medium of claim 31 further comprising code that automatically finds a shortest path for each of the circuits involved in the upgrade.

38. The computer-readable storage medium of claim 37 further comprising code that automatically forces traffic to the shortest path in the circuit upgrade.

39. A system for performing an upgrade in a Synchronous Optical Network (SONET) communication network comprising network elements coupled together to form one or more circuits, the circuit upgrade generated at a node in communication with the circuits and providing increased protection, the system comprising:

means for providing at the node a list of circuits or spans available for the upgrade;

means for receiving input from a user identifying at least one existing circuit to be upgraded or at least one span for the upgraded circuit and a type of upgrade to be performed; and means for automatically performing the upgrade to increase protection of said existing circuit, the upgraded circuit comprising a unidirectional path switched ring (UPSR) or a bi-directional line switched ring (BLSR), wherein means for automatically performing the upgrade comprises:

means for identifying an alternate path for use in the circuit upgrade;

means for creating an upgrade object at a source node and a destination node in the circuit to be upgraded and at least one node in said alternate path, said upgrade object comprising a state of a process of the circuit upgrade and old and new connection types identifying the network element connection types before and after the circuit upgrade; and means for changing said state of said upgrade object as the circuit upgrade is performed on the network element.

40. The system of claim 39 further comprising means for storing information on network elements and circuits containing the network elements.

* * * * *